United States Patent
Ouwenga et al.

(10) Patent No.: US 10,302,085 B2
(45) Date of Patent: May 28, 2019

(54) SUPERCHARGER WITH AIR VENT PATHWAY TO ENGINE

(71) Applicant: EATON CORPORATION, Cleaveland, OH (US)

(72) Inventors: Daniel R. Ouwenga, Portage, MI (US); Paul J. McWilliams, Mendon, MI (US)

(73) Assignee: Eaton Intelligent Power Limited, Dublin (IE)

( * ) Notice: Subject to any disclaimer, the term of this patent is extended or adjusted under 35 U.S.C. 154(b) by 240 days.

(21) Appl. No.: 14/851,384

(22) Filed: Sep. 11, 2015

(65) Prior Publication Data

US 2016/0003249 A1    Jan. 7, 2016

Related U.S. Application Data

(63) Continuation of application No. PCT/US2014/023580, filed on Mar. 11, 2014.

(60) Provisional application No. 61/776,568, filed on Mar. 11, 2013.

(51) Int. Cl.
| F04C 27/00 | (2006.01) |
| F02B 37/04 | (2006.01) |
| F04C 29/12 | (2006.01) |
| F04C 18/12 | (2006.01) |

(52) U.S. Cl.
CPC ............ *F04C 27/005* (2013.01); *F02B 37/04* (2013.01); *F04C 18/126* (2013.01); *F04C 29/122* (2013.01)

(58) Field of Classification Search
CPC ...... F02B 37/04; F04C 18/126; F04C 27/005; F04C 29/122
See application file for complete search history.

(56) References Cited

U.S. PATENT DOCUMENTS

| 4,196,910 | A | | 4/1980 | Aizu |
| 4,770,615 | A | * | 9/1988 | Fujiwara ............... F04C 29/122 418/15 |
| 7,484,368 | B2 | * | 2/2009 | Jorgensen ............... F02B 37/04 60/607 |
| 2005/0147517 | A1 | | 7/2005 | Dreifert et al. |
| 2005/0188694 | A1 | | 9/2005 | Frankenstein |
| 2011/0088667 | A1 | | 4/2011 | Bell et al. |
| 2011/0150671 | A1 | | 6/2011 | Ouwenga |
| 2011/0308504 | A1 | * | 12/2011 | Kobayashi ............. F01M 13/00 123/574 |
| 2012/0037130 | A1 | * | 2/2012 | Fuqua ...................... F01B 7/08 123/51 R |

FOREIGN PATENT DOCUMENTS

| CN | 1880766 A | 12/2006 |
| CN | 204060911 U | 12/2014 |
| JP | 2002349462 A | * 12/2002 |

OTHER PUBLICATIONS

International Search Report and Written Opinion for International Patent Application No. PCT/US2014/023580, dated Jun. 27, 2014.

* cited by examiner

*Primary Examiner* — Mary Davis
(74) *Attorney, Agent, or Firm* — Merchant & Gould P.C.

(57) ABSTRACT

The present invention relates to compression based engine boosting systems, and, more particularly, to a supercharger configuration for higher pressure applications.

13 Claims, 14 Drawing Sheets

SUPERCHARGER WITH AIR VENT PATHWAY TO ENGINE

CROSS-REFERENCE TO RELATED APPLICATION(S)

This application is a Continuation Application of International Application No. PCT/US2014/023580, filed on 11 Mar. 2014, and claims priority to U.S. Patent Application Ser. No. 61/776,568 filed on 11 Mar. 2013, the disclosures of which are incorporated herein by reference in their entirety.

TECHNICAL FIELD

The present invention relates to engine boosting systems, and, more particularly, to a supercharger configuration for higher pressure applications.

BACKGROUND

Superchargers and turbocharger are used to increase the amount of air supplied to an internal combustion engine. Both these systems increase the pressure of the air that enters the engine, thereby increasing the density of the engine intake air. Turbochargers are driven by the engine exhaust whereas superchargers are driven mechanically by the engine itself. There are a number of known advantages and disadvantages associated with both types of systems. For example, while turbochargers are recognized as being relatively more fuel efficient than superchargers, turbochargers typically have some delayed response commonly known as lag. Improved boost systems are desirable.

SUMMARY

The present disclosure provides a boost system that includes a supercharger system with features that improve its efficiency. In one embodiment the supercharger system includes a configuration that more effectively seals the rotor cavity from the drive assembly cavity, which enables it to effectively handle higher boost pressures. The feature of the improved supercharger system results in a supercharger system that is particularly suitable to be used in boost systems that included a supercharger arranged downstream from a turbocharger, which is sometimes referred to as a turbo-super system. The combined supercharger and turbocharger boost system combines the benefits of a supercharger system with those of a turbocharger, to meet the fuel efficiency targets, while maintaining or improving vehicle performance over a system that utilizes only a supercharger or only a turbocharger. The present disclosure can also be used in system that only include a supercharger or system that include both a supercharger and a turbo charger wherein the supercharger is upstream of the turbo charger, which is sometimes referred to a super-turbo system.

DESCRIPTION

Figure 1:
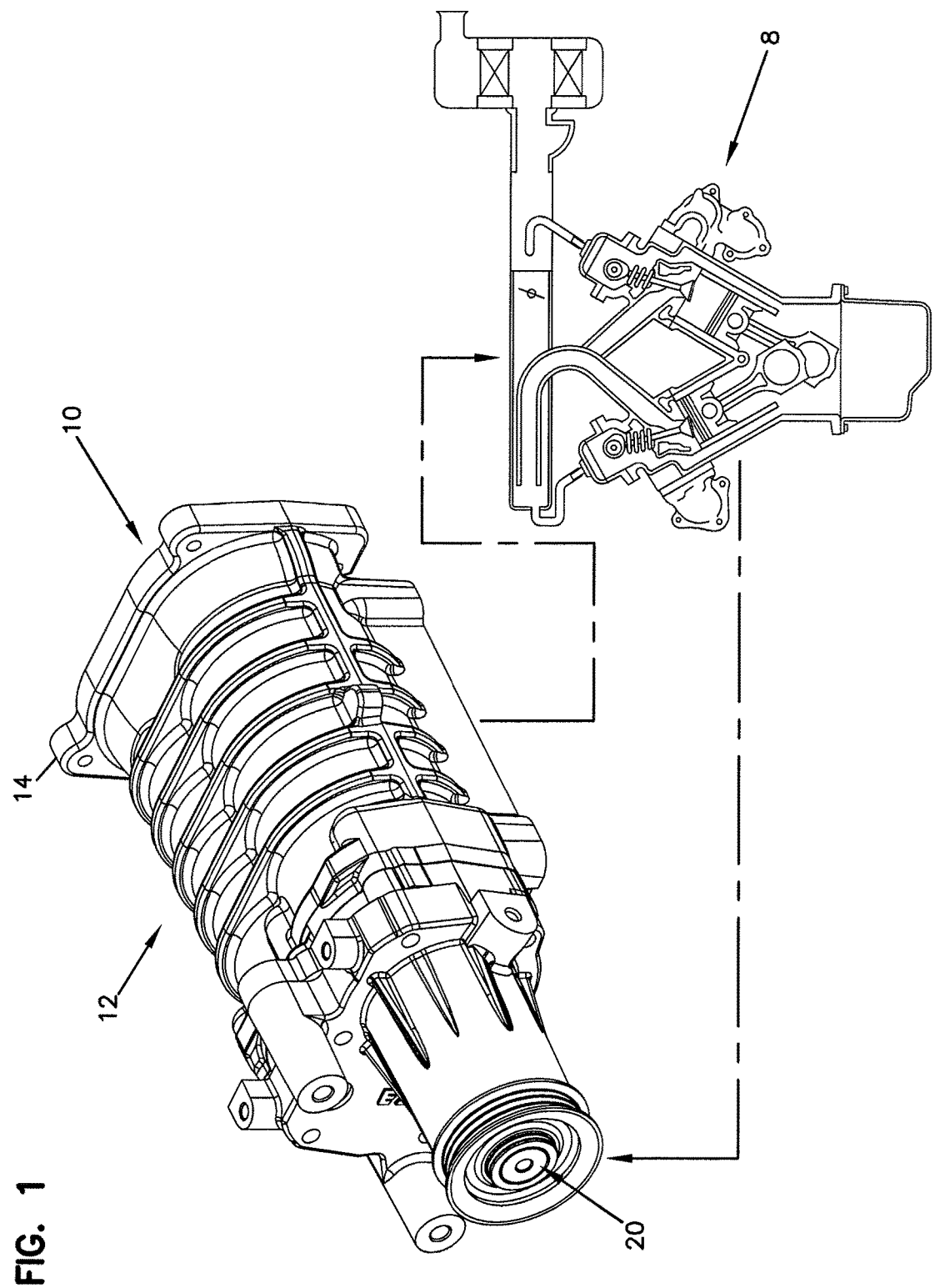
FIG. 1 is an isometric top view of a supercharger system according to the present disclosure.
Figure 2:
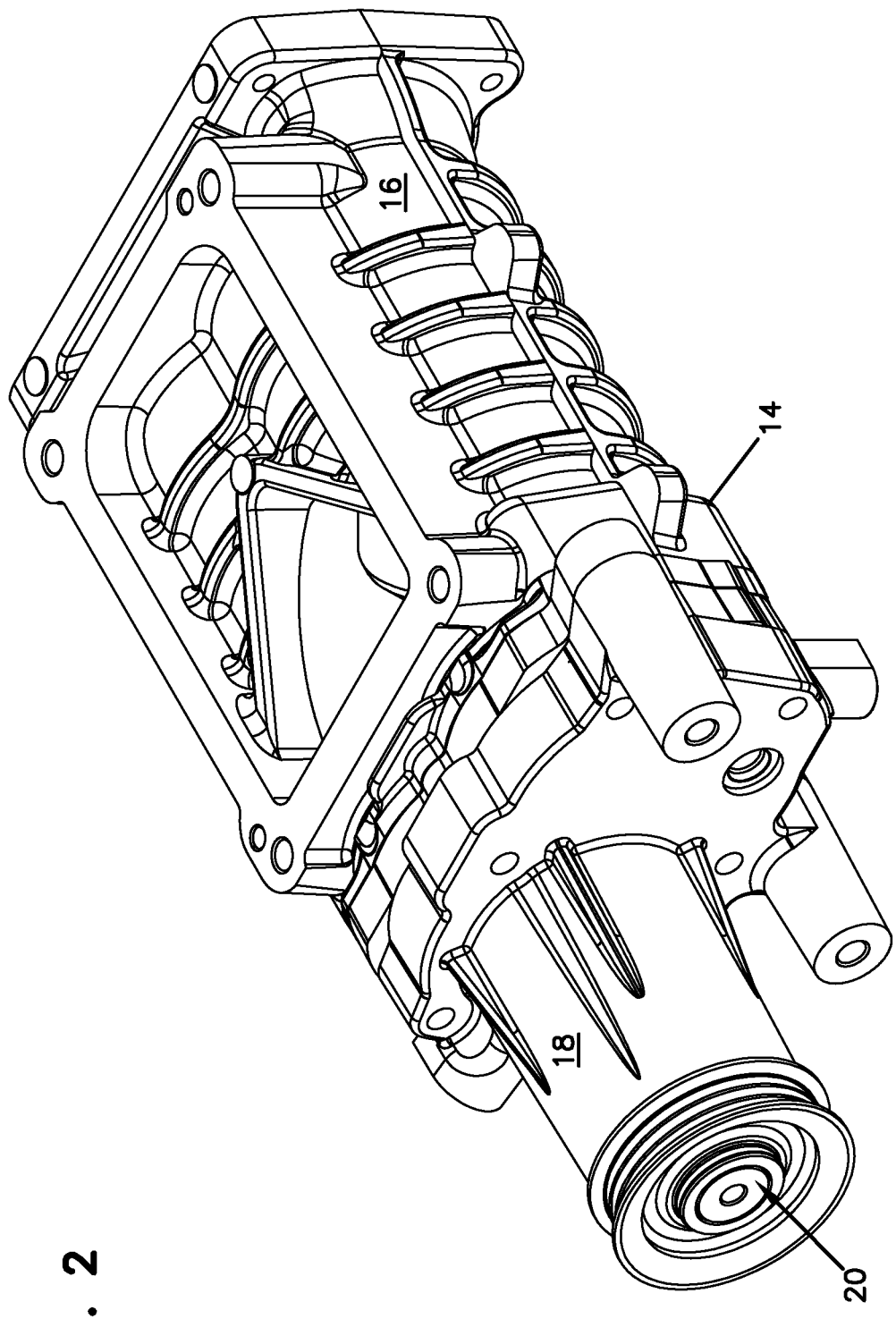
FIG. 2 is an isometric bottom view of a supercharger system of FIG. 1.

Referring to the figures, an example boost system according to one embodiment of the present disclosure is shown. In the depicted embodiment, the boost system includes both a turbocharger and a supercharger. The turbocharger 10 is powered by the exhaust from the engine 8, receives ambient intake air, and compresses the air. The compressed air from the turbocharger 10 is directed to an intake of a supercharger 12, which causes the air to be further compressed before the air is delivered to the engine for combustion.

In the depicted embodiment the supercharger 12 includes a supercharger housing 14 that includes a rotor cavity portion 16 that defines a rotor cavity and an adjacent gear case portion 18 that defines a gear case cavity. An input drive shaft 20 of the supercharger 12 extends out of the gear case 18 of the supercharger housing 14 and is driven via a pulley belt assembly by an output shaft of the engine 8. Within the rotor cavity is a first rotor 22 and a second rotor 24 that when driven mesh and moves the air within the rotor cavity portion 16 of the housing 14 from an inlet to an outlet. For example, the rotors 22, 24 can include lobes that intermesh with one another. The lobes can define pockets that receive air from the inlet and move the air through the rotor cavity to the outlet.

In the depicted embodiment a first rotor drive shaft 26 extends through the first rotor 22, and a second rotor drive shaft 28, which is generally parallel to the first rotor shaft 26, extends through the second rotor 24. A gear assembly 30 located within the gear case portion 18 (also referred to as the gear box) of the supercharger is configured to transfer torque between the input drive shaft 20 and the first and second rotor drive shafts 26, 28. In the depicted embodiment the driven ends of the first and second rotor drive shafts extend through a stationary bearing plate 32. In the depicted embodiment the bear plate 32 divides the rotor cavity 16 of the housing 14 from the gear case portion 18. The depicted embodiment includes timing gears provided in the gear case ensure that the rotors rotate at the same speed and do not contact one another.

In the depicted embodiment, during operation of the supercharger the air pressure in the rotor cavity portion 16 increases. In the depicted embodiment the air pressure in the rotor cavity can be as high as 30-50 psi during normal operations. Left unmanaged, the air in the rotor cavity portion 16 could escape past the bearing plate 32 into the gear case 18. When air leaked from the rotor cavity 16 into the gear case 18, it can escape out of the gear case 18 via the annular sealing assembly 34 between the input shaft 20 and gear case 18, and/or force lubrication fluid out of the annular sealing assembly 34.

Leakage of air and oil from the pulley end of the gear box is undesirable for a number of reasons including, for example, contamination of the engine compartment due to lubrication fluid leakage, failure of the components in the gear case due to lack of lubrication, decrease in possible boost pressure due to the leakage of air from the rotor cavity 16, and degraded engine performance due to the discrepancy in the amount of metered air and actual air that is combusted by the engine 8. In the depicted embodiment, the air within the rotor cavity 16 is managed to limit the amount of air leakage from the rotor cavity 16 into the gear case 18.

As discussed above, in the depicted embodiment, the first and second rotor drive shafts 26, 28 extend through the bearing plate 32. The driven end portions 36, 38 of the first and second rotor drive shafts 26, 28 are supported by bearings 40, 42 that are pressed into the gear case side of the bearing plate 32 against shoulders 44, 46. The driven end portions 36, 38 are mechanically engaged with and driven by the gear assembly 30, which is driven by the input shaft 20.

In the depicted embodiment, a portion of the end faces of the bearings 40, 42, oil seal annular cylindrical surfaces 54, 56 of the bearing plate 32, end oil seal facing surfaces 52, 53 of the bearing plate 32, and exterior cylindrical surfaces 48, 50 of the driven end portions 36, 38 of the first and second rotor shafts 26, 28 cooperatively form first and second oil seal cavities 58, 60. A first annular oil seal 62 is positioned within the first oil seal cavity 58, and a second annular oil seal 64 is positioned within the second oil seal cavity 60. In the depicted embodiment the first and second annular oil seals 62, 64 limit the amount of lubrication fluid that escapes the gear case 18.

In the depicted embodiment the driven end portions 36, 38 of the first and second rotor drive shafts 26, 28 include a ring seal arrangement that is configured to limit the amount of air leakage past the bearing plate 32 in the direction of the gear case 18. The ring sealing arrangement is located between the rotor cavity 16 and the first and second oil seal cavities 58, 60, and the first and second oil sealing cavities 58, 60 are located between the gear case 18 and the ring sealing arrangement.

In the depicted embodiment the ring sealing arrangement includes a first annular receiving groove 66 on the first rotor drive shaft 26 located coaxial and adjacent the first oil sealing cavity 58, and a second annular receiving groove 88 on the second rotor drive shaft 28 located coaxial and adjacent the second oil sealing cavity 60. In the depicted embodiment a first ring seal 70 is located in the first annular ring receiving groove 66, and a second ring 72 is located in the second annular ring receiving groove 88. The rings 70, 72 are biased outwardly in the radial direction, and contact ring seal annular cylindrical surfaces 74, 76 of the bearing plate 32. In the depicted embodiment the ring sealing assembly limits the amount of air pressure that acts on the oil seals 62, 64, and the oils seals limit the amount of lubrication fluid that reaches the ring sealing assembly.

In the depicted embodiment an annular space 63 is located between the ring seal, the oil seal, the bearing plate, and the exterior cylindrical surfaces 48, 50 of the driven end portions 36, 38 of the first and second rotor shafts 26, 28. If pressurized air from the rotor cavity 16 flows past the ring sealing arrangement, the air pressure would act on the oil seals 62, 64. For reasons discussed above, it is desirable to minimize the amount of pressurized air acting on these oil seals 62, 64.

In the depicted embodiment, an air vent system is provided which manages the air from the space between the rings 70, 72 and the oil seals 62, 64. In the depicted embodiment the air vent system maintains a low pressure in the area by channeling the air from between the rings 70, 72 and the oil seals 62, 64 to a low pressure area of the engine.

In the depicted embodiment the air is not vented to the atmosphere in part because the air between the rings 70, 72 and the oil seals 62, 64 is "metered" air. In other words, the air that enters the supercharger has been measured and accounted for by the engine, and if the air was vented to the atmosphere could cause the engine to run "rich" since the expected fuel air ratio would not match reality. In particular, less air would reach the engine for combustion than expected. It should be appreciated many other configurations are also possible. For example, in an alternative embodiment the air between the rings and oil seal could be vented to the atmosphere as the vented air could be so small in volume as to not cause significant fuel air inaccuracies for the particular application, the vented air could be measured or estimated and accounted for (e.g., subtracted from the "metered" air), or the air could be metered after exiting the supercharger as opposed to prior to entering the supercharger.

Figure 10:
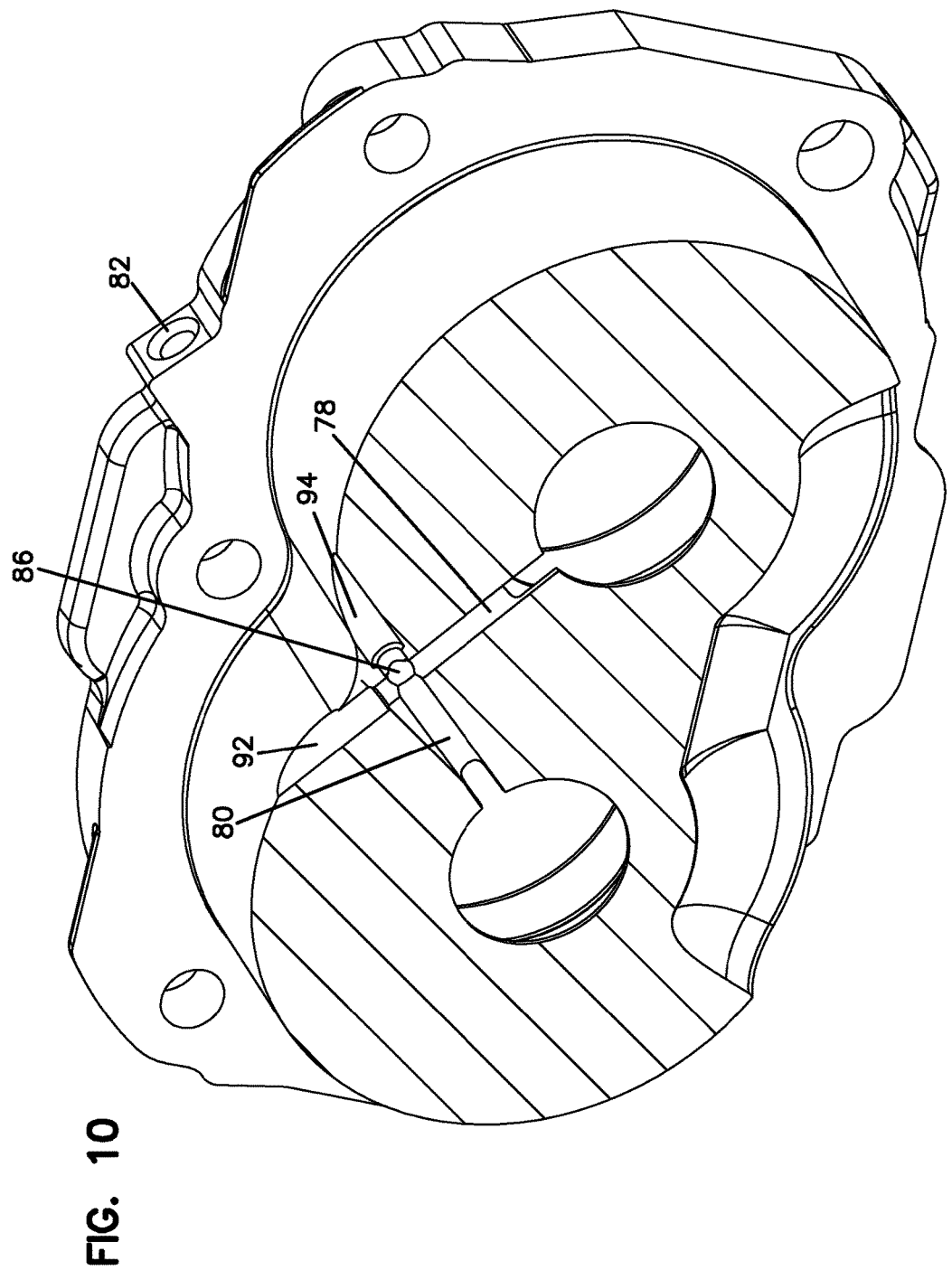
FIG. 10 is a cross-sectional view along line 10-10 of FIG. 8.
Figure 11:
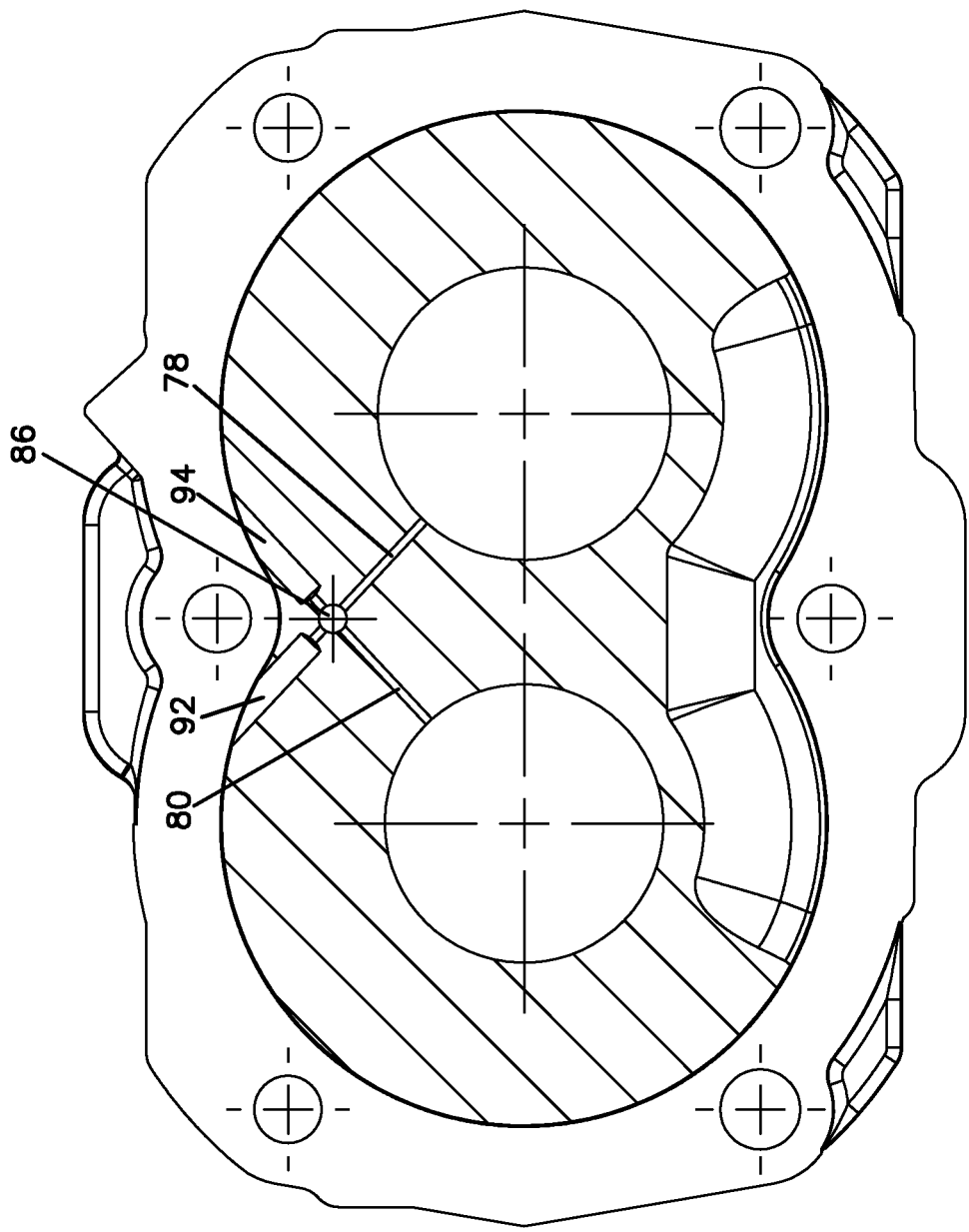
FIG. 11 is a cross-sectional view along line 11-11 of FIG. 8.

In the depicted embodiment, the air that flows into the space between the rings 70, 72 and oil seals 62, 64 is channeled back into the air intake system for combustion. In the depicted embodiment the air vent system includes a first air vent pathway 78 located between the first ring 70 and first annular oil seal 62, and a second air vent pathway 80 located between the second ring 72 and the second annular oil seal 64. See, for example, FIGS. 10 and 11.

Figure 3:
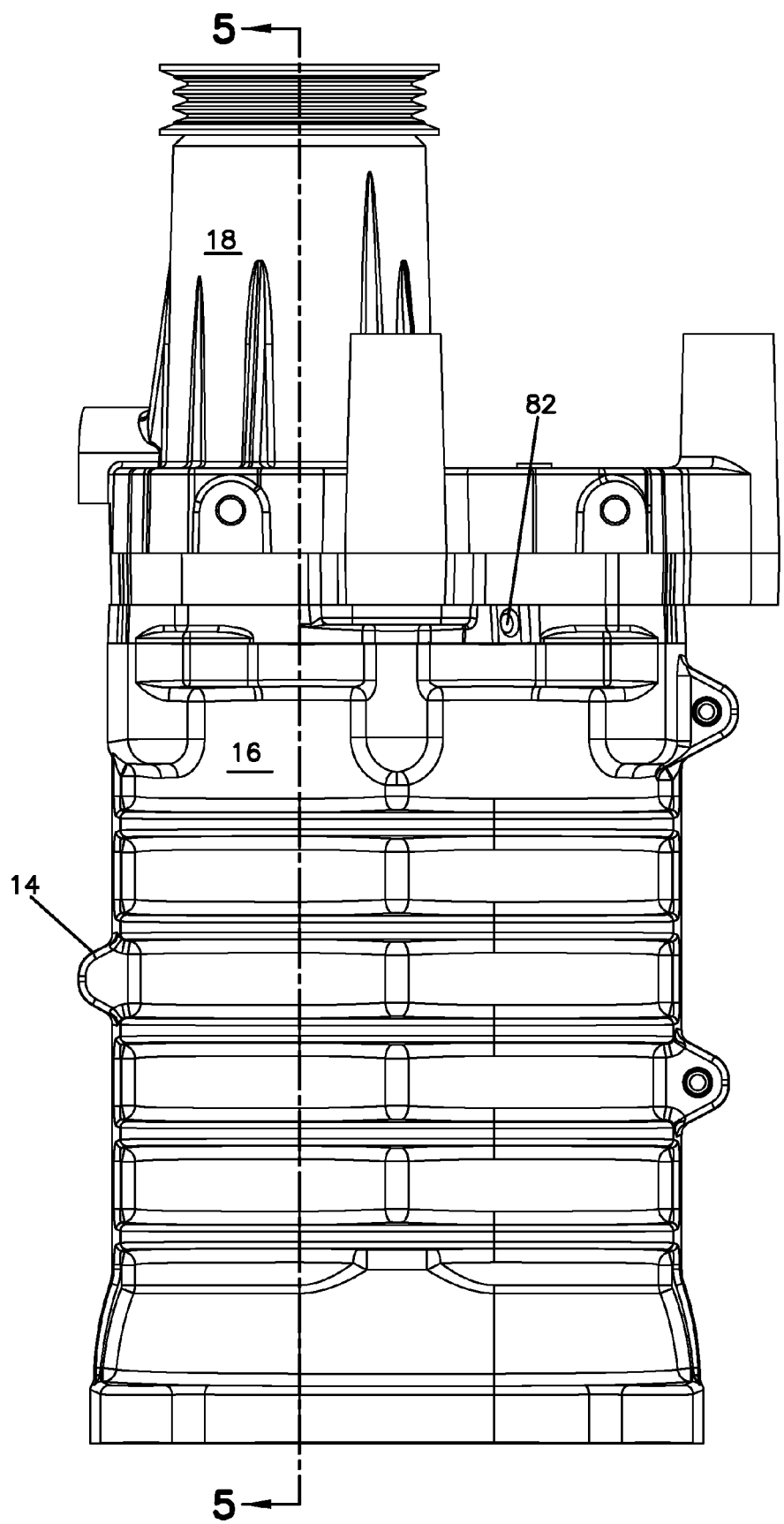
FIG. 3 is a top view of the supercharger of FIG. 1.
Figure 4:
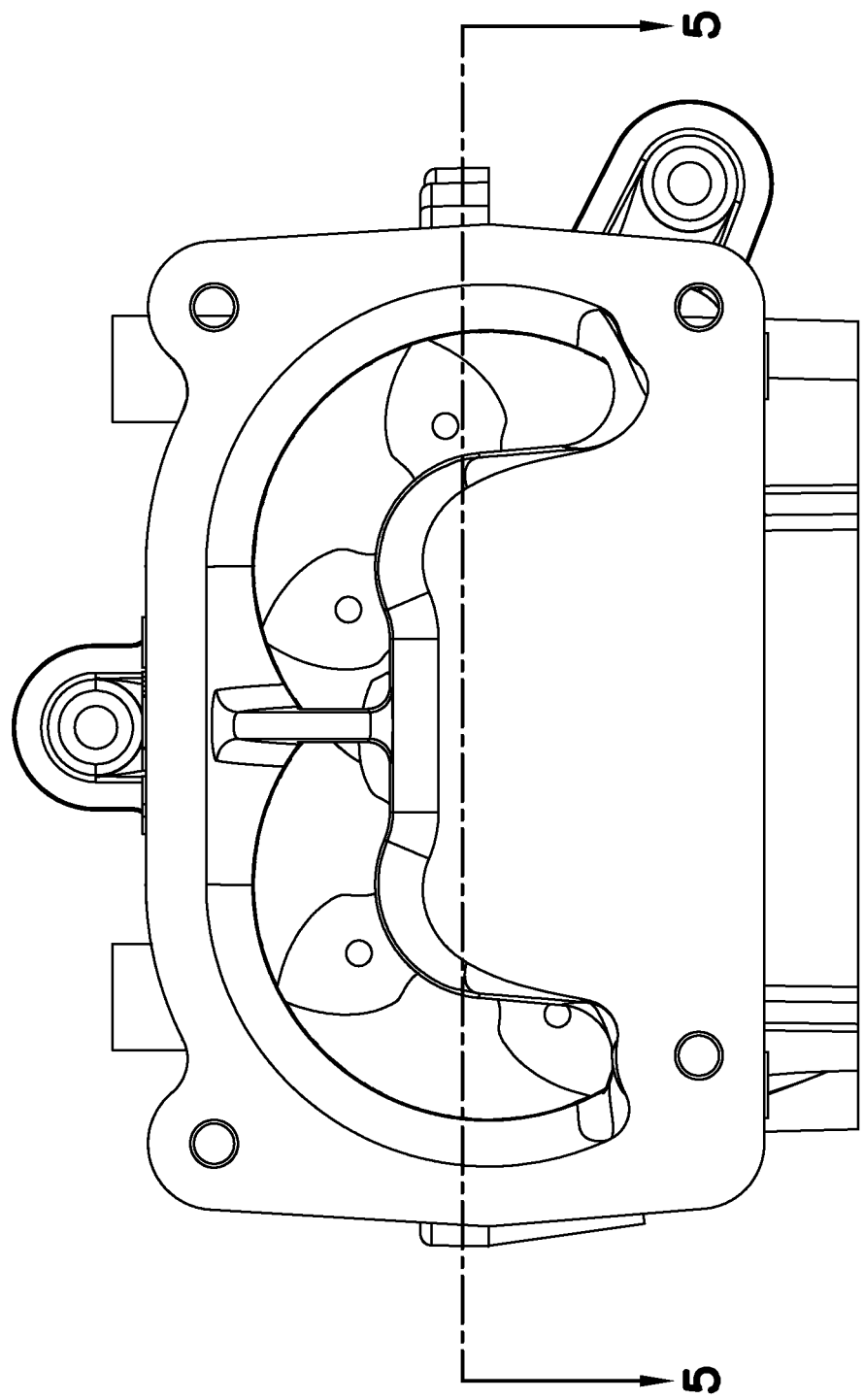
FIG. 4 is an end view of the supercharger of FIG. 1.
Figure 5:
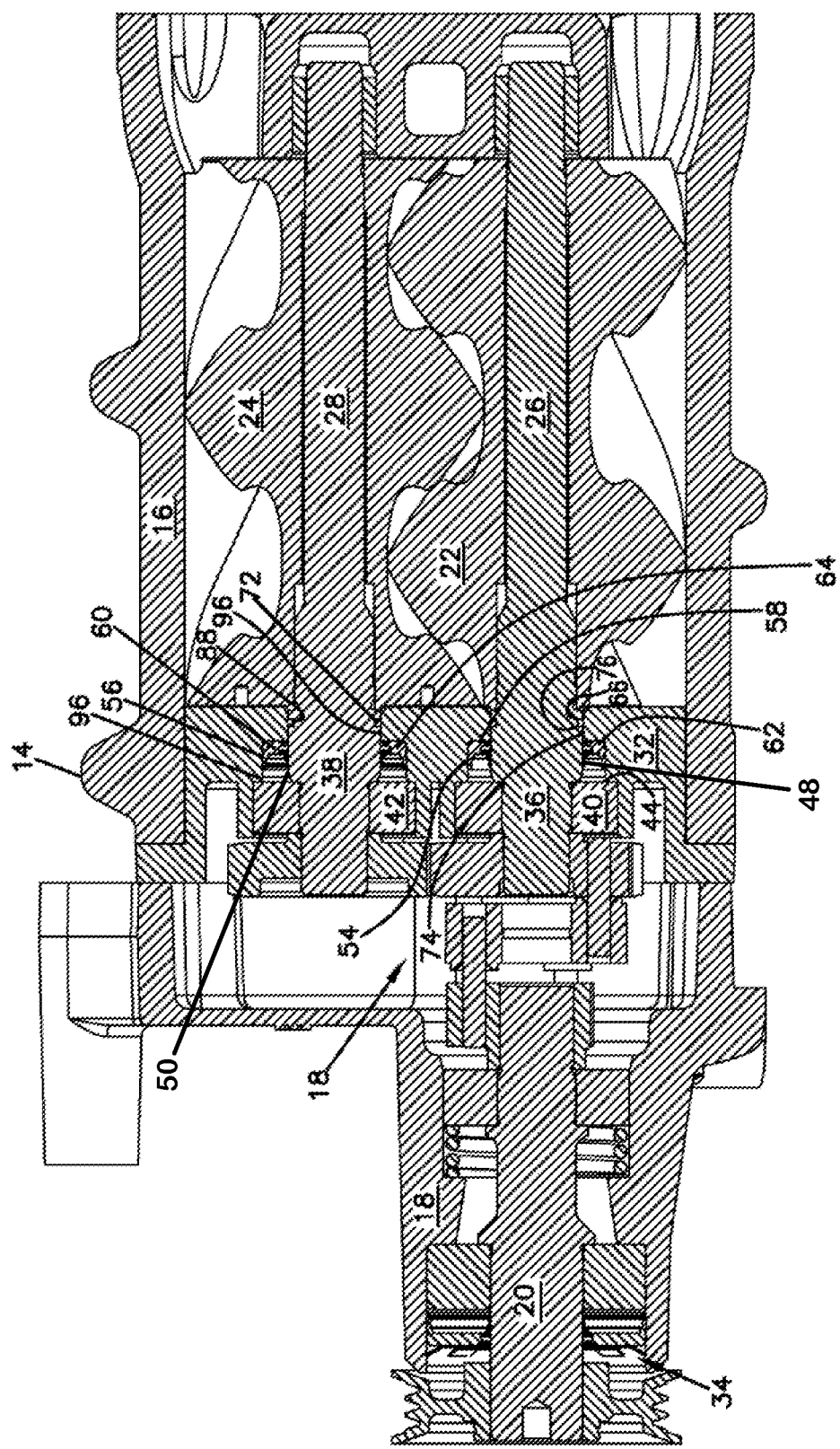
FIG. 5 is a cross-sectional view of the supercharger along line 5-5 of FIG. 4.
Figure 6:
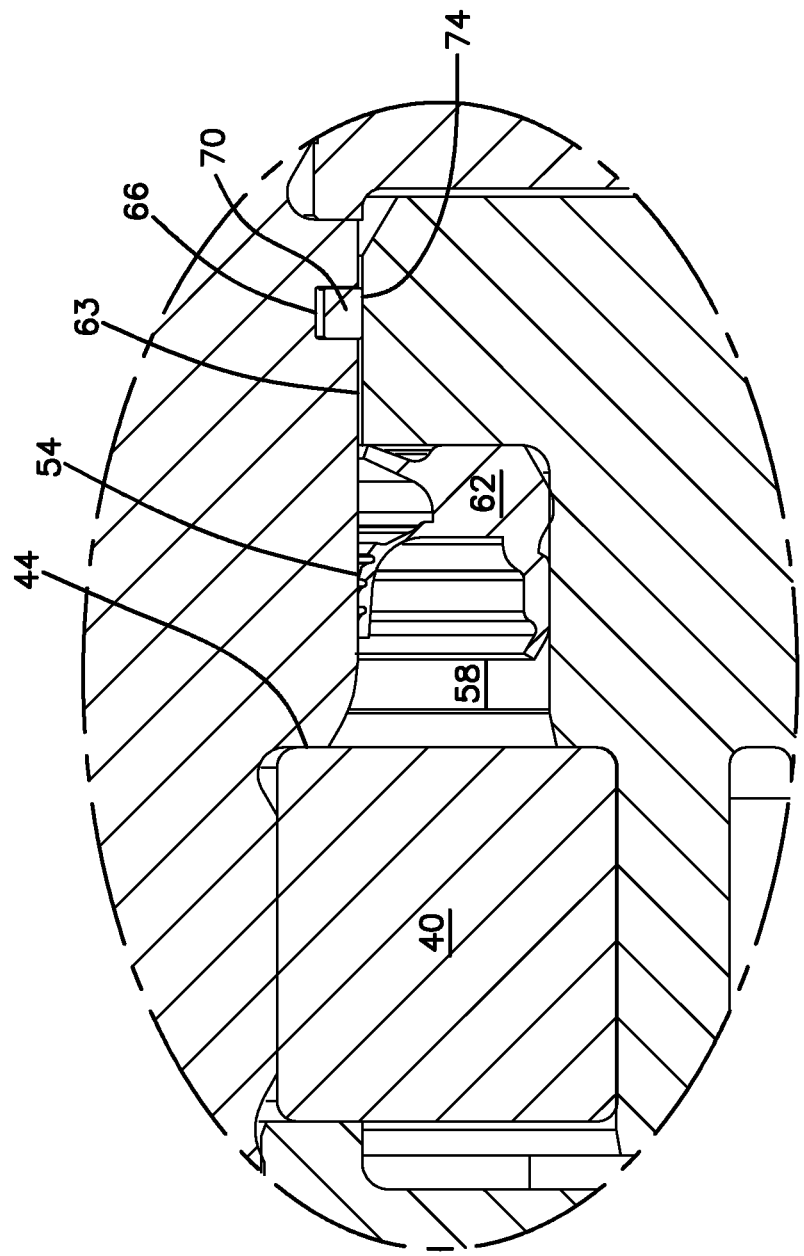
FIG. 6 is an enlarged view of a portion of FIG. 5.
Figure 8:
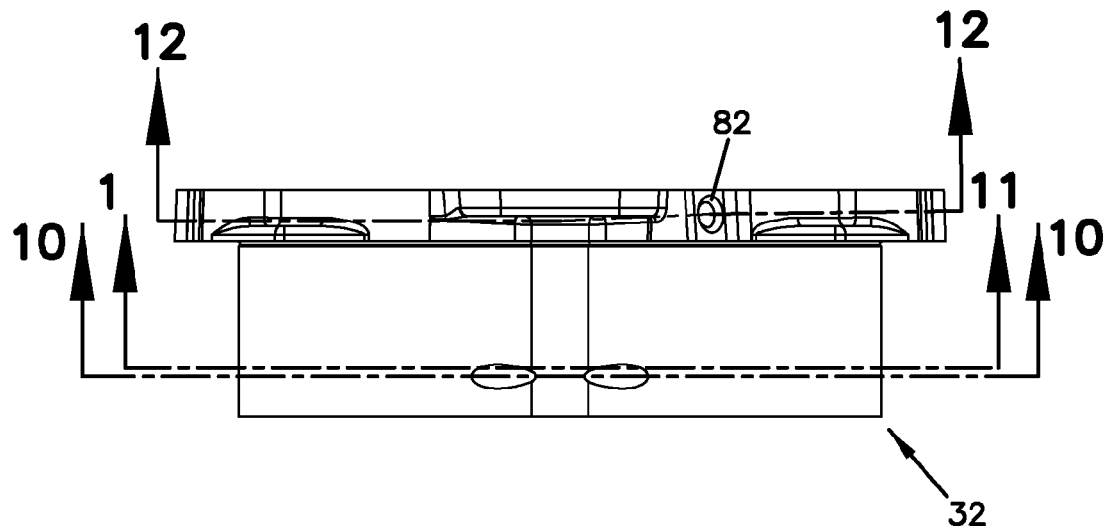
FIG. 8 is a top view of the structure depicted in FIG. 7.
Figure 9:
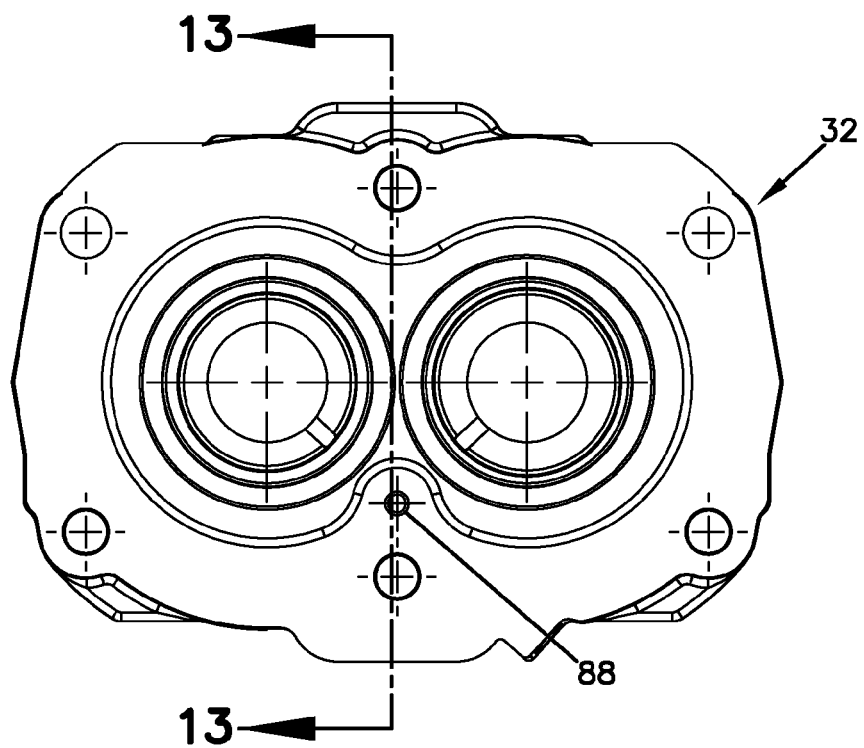
FIG. 9 is a rear elevation view of the structure depicted in FIG. 7.
Figure 12:
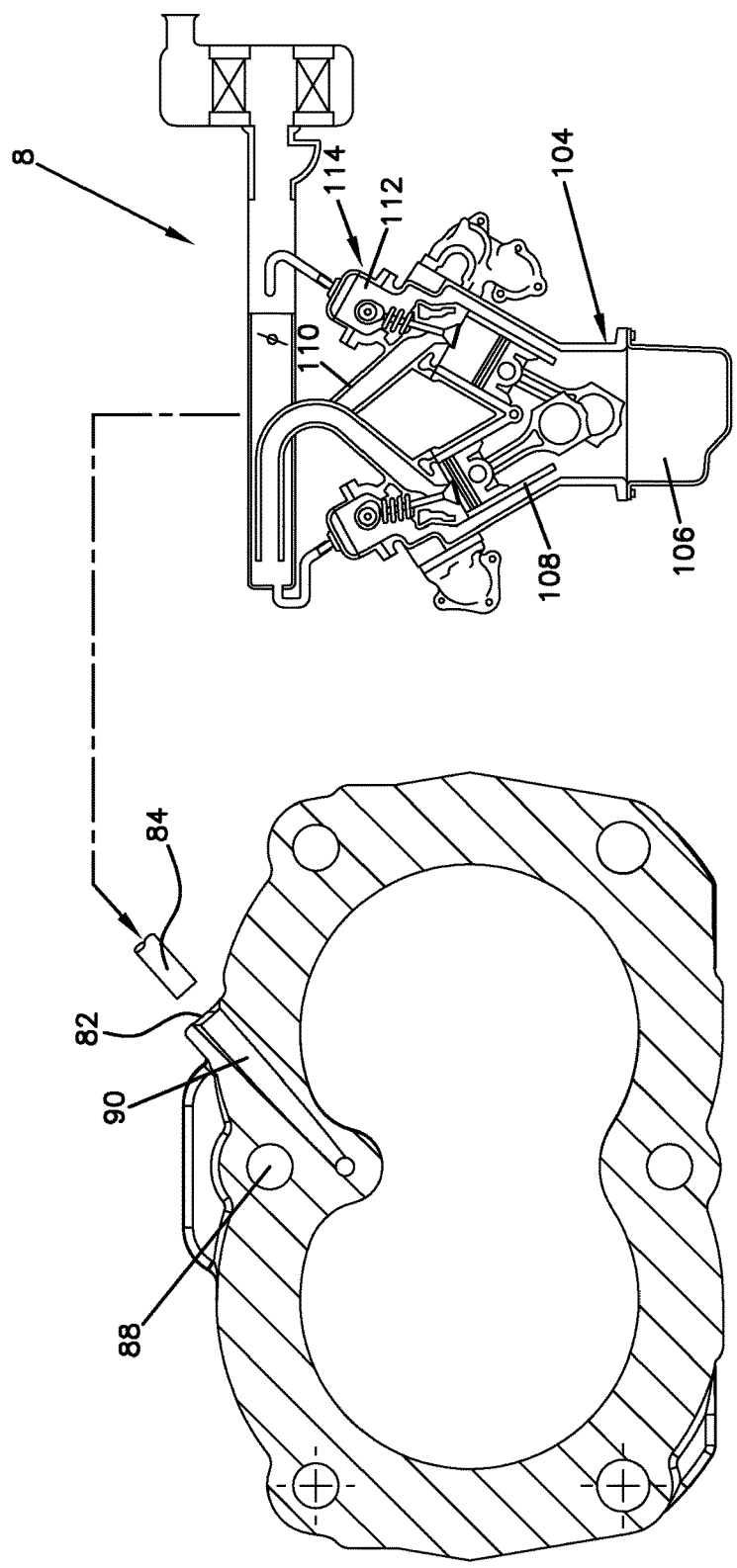
FIG. 12 is a cross-sectional view along line 12-12 of FIG. 8.

In the depicted embodiment, the first and second air vent pathways 78, 80 intersect and flow together to an air outlet port 82. See, for example, FIGS. 3, 8 and 10. An air conduit 84 connected to the outlet port is configured to direct air from the air outlet port back into the engine 8. See, for example, FIGS. 1 and 12. In the depicted embodiment the conduit 84 is configured to direct air from the outlet port into the engine at a location wherein the pressure therein is between 0.5 to 1.5 atmospheres, thereby maintaining a relative low air pressure acting on the oil seals 62, 64. In the depicted embodiment the pressure acting on the oil seals 62, 64 is managed both by the ring seal configuration and the air venting arrangement. The system is configured such that pressure on the rotor cavity side of the ring can be as great as 45 psi and pressure on the gear side of the ring is less than 14.7 psi.

Figure 7:
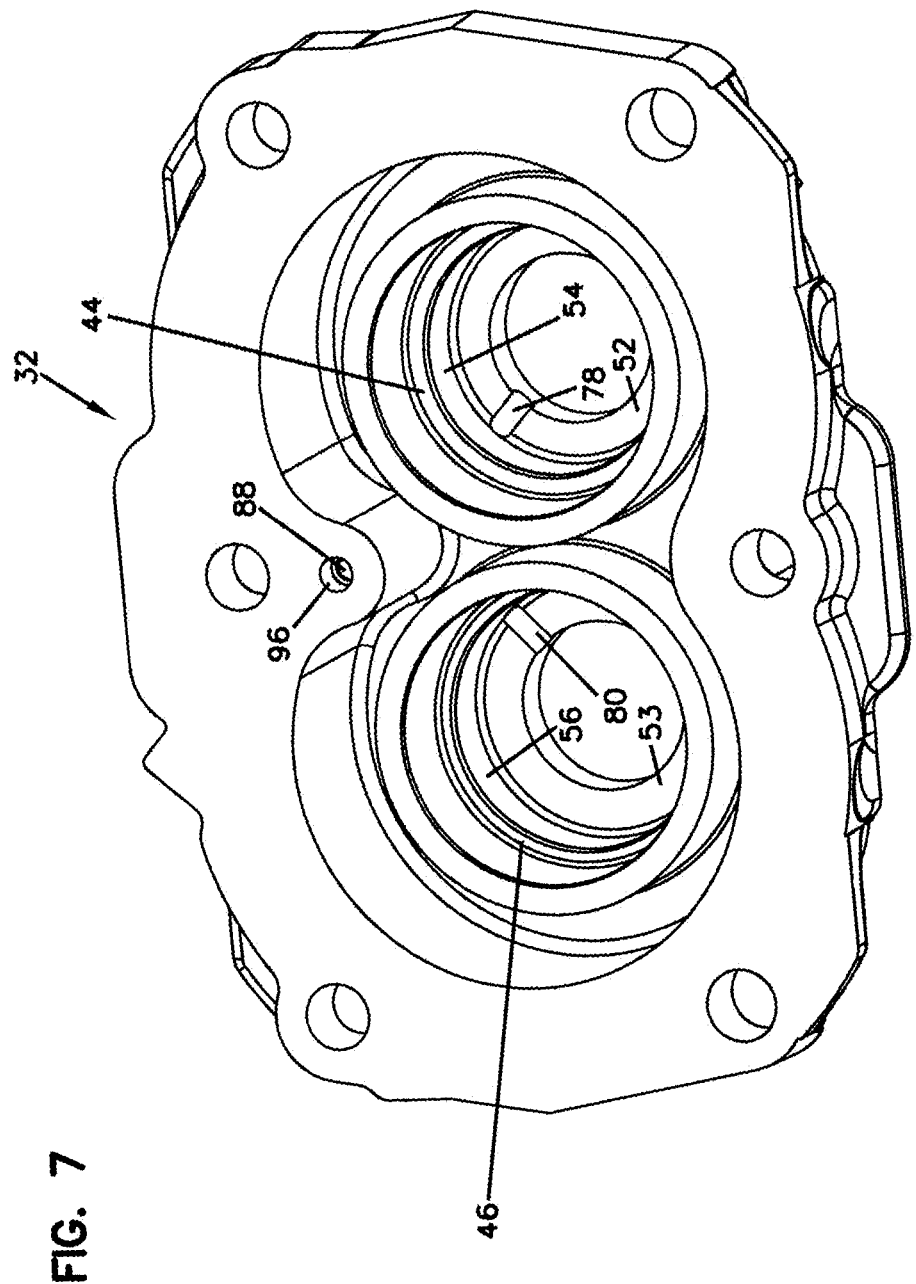
FIG. 7 is a rear isometric view of a component of the supercharger of FIG. 1.
Figure 13:
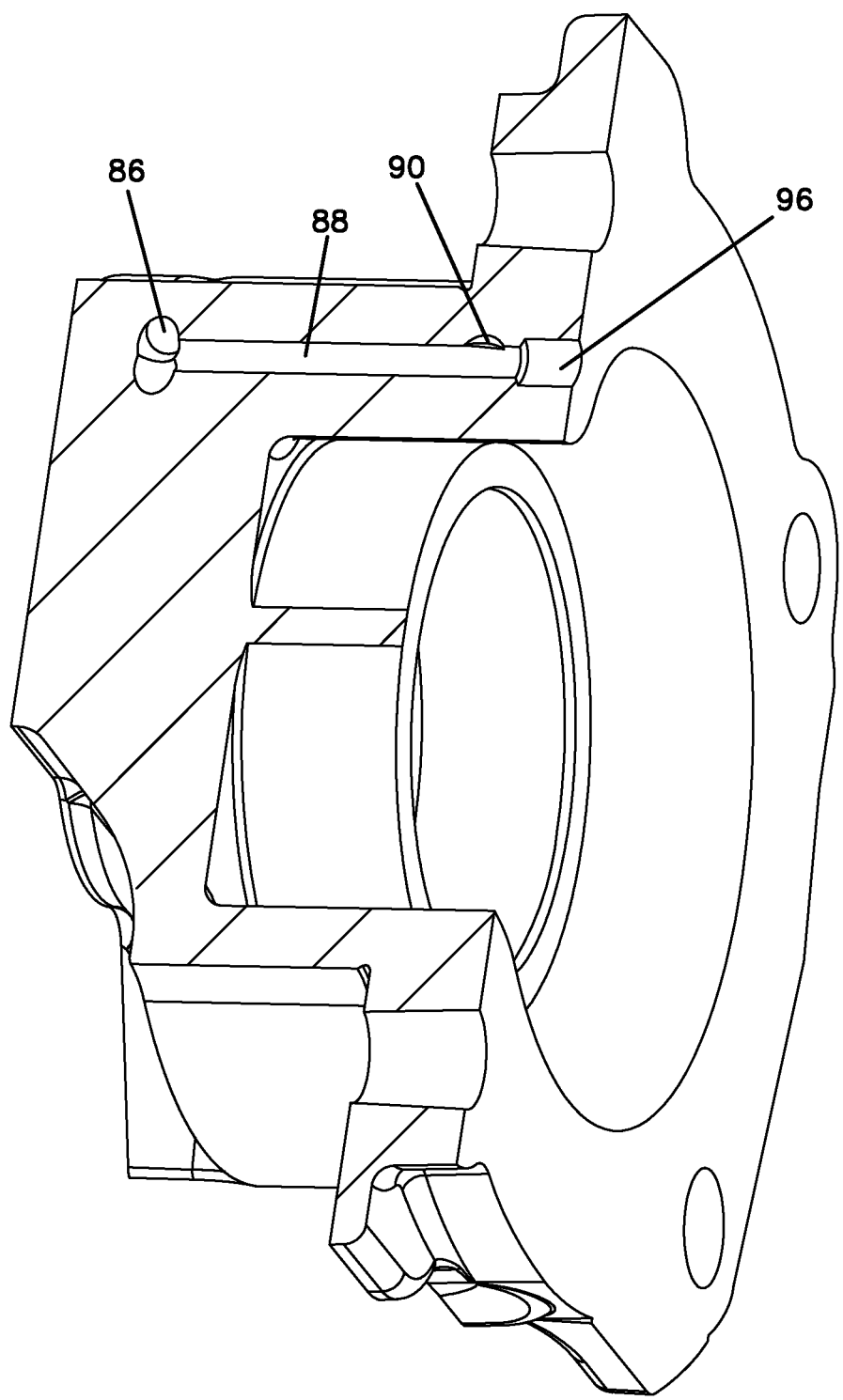
FIG. 13 is a cross-sectional view along line 13-13 of FIG. 9.
Figure 14:
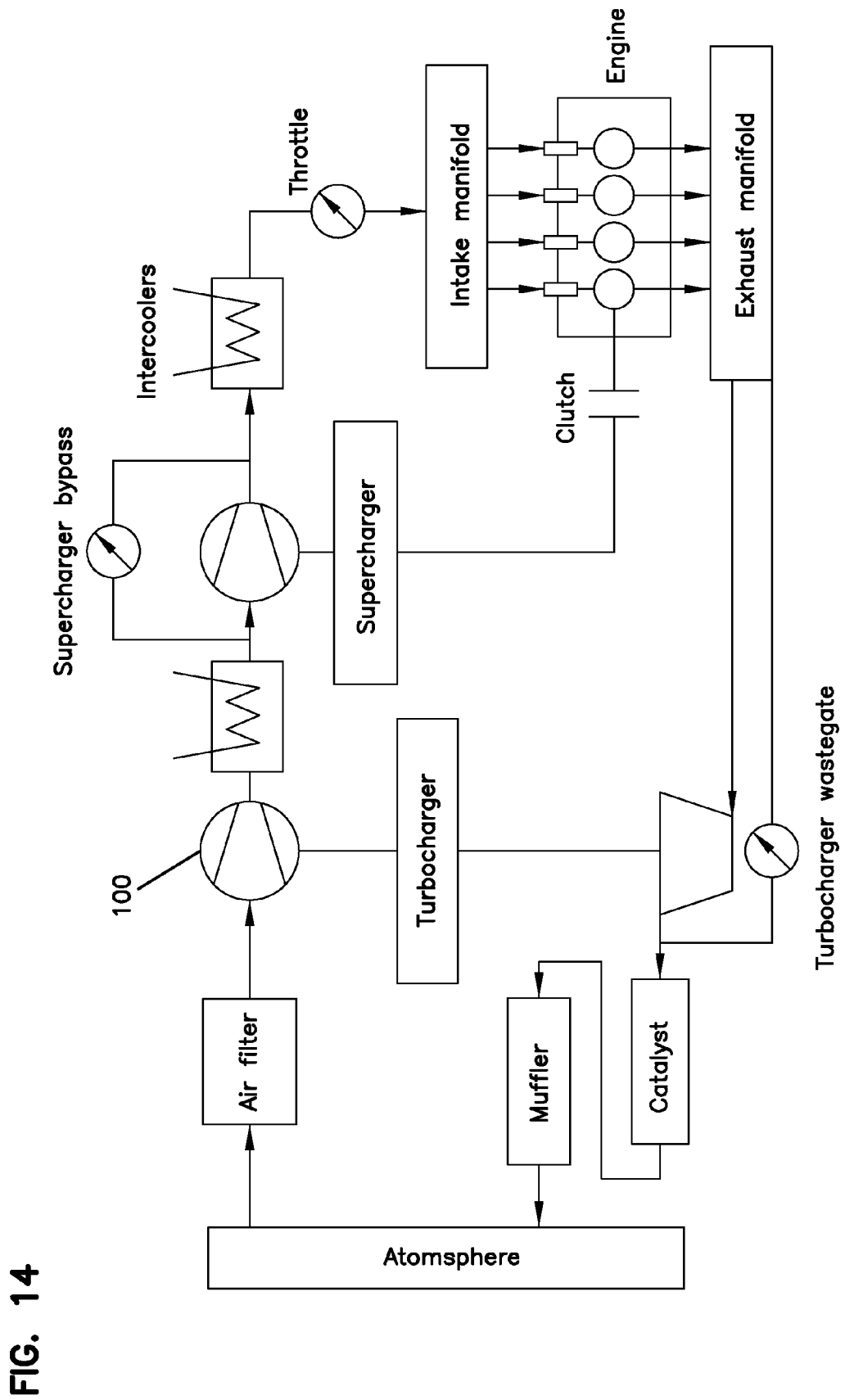
FIG. 14 is a schematic view of a turbo-super system according to the present disclosure.
Figure 15:
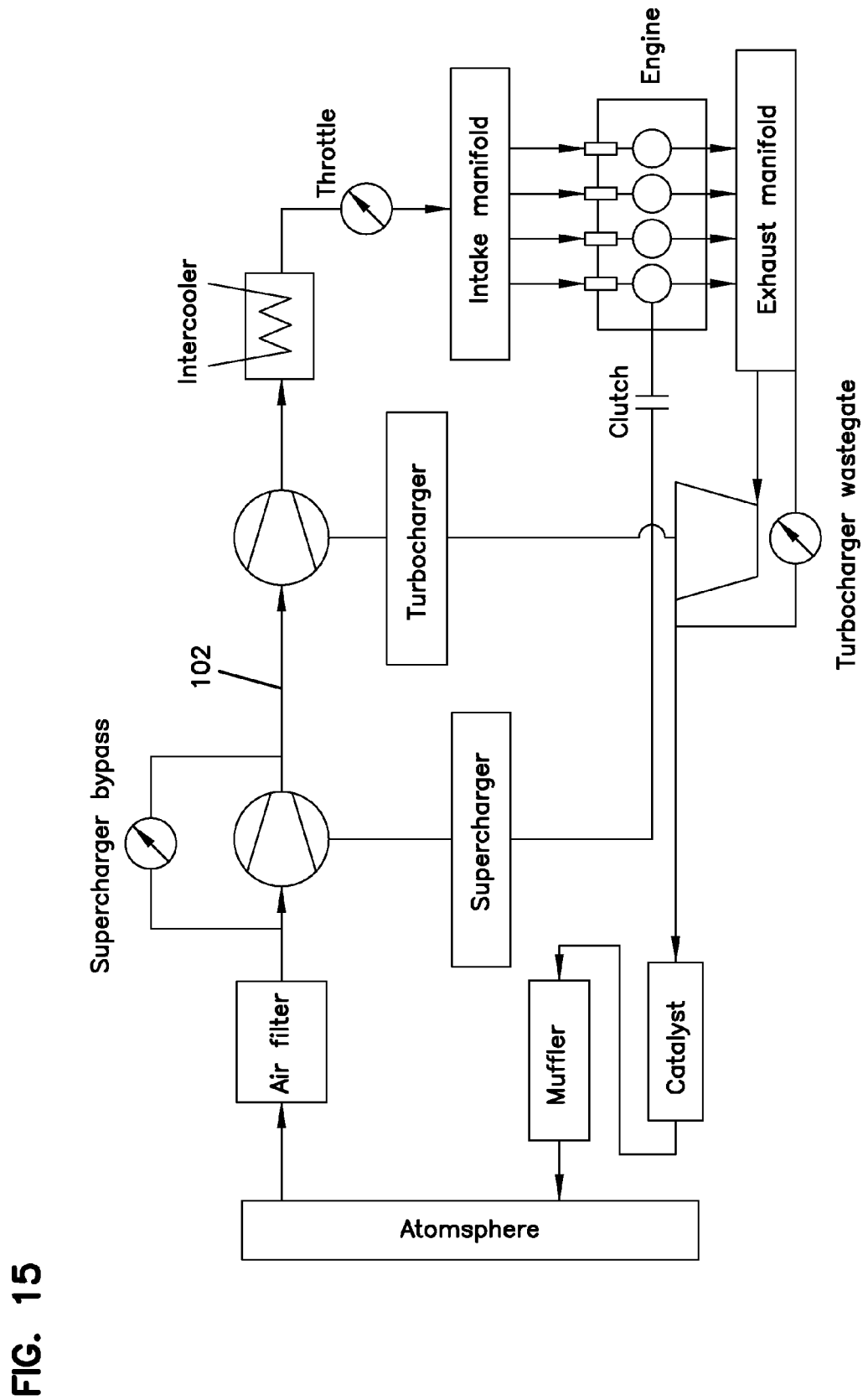
FIG. 15 is a schematic view of a super-turbo system according to the present disclosure.

In the depicted embodiment, the conduit 84 is configured to direct air from the outlet port 82 into the crankcase 104 of an engine 8. In particular, the conduit 84 could be configured to direct air from the outlet port 82 to, for example, the oil pan 106, the cylinder block 108, or the positive crank case ventilation system 114 (e.g., intake manifold 110, PVC valve 112). See FIG. 12. In an alternative embodiment, the conduit 84 is configured to direct air from the outlet port 82 into a location 100, 102 on the engine upstream of a turbocharger, where the pressure is less than 2 ATM. See FIGS. 14 and 15. In the depicted embodiment the first air vent pathway 78 overlaps with a first oil seal receiving cavity 58 in an axial direction, and the second air vent pathway 80 overlaps with a second oil seal receiving cavity 60 in an axial direction. See, for example, FIGS. 7 and 10. In the depicted embodiment the first and second air vent paths 78, 80 are straight intersecting first and second drilled bores of between 2.0 millimeters and 4.0 millimeters (e.g., 3 millimeters). The first and second vent paths 78, 80 (first and second bores) intersect in a first junction 86. A third bore hole 88 extends from an exterior of a bearing plate to the first junction 86. A fourth bore hole 90 extends from an exterior of a bearing plate and intersects with the third bore hole 88. See, for example, FIGS. 12 and 13. In the depicted embodiment bore hole 90 is a plane that is angles towards the gear case and extends to outlet port 84. See, section line 12-12 of FIG. 8. In the depicted embodiment plug receiving counter bores 92, 94, 96 are located at the outer ends of the bores 78, 80, 88. When plugs are inserted into the plug receiving counter bores an air path is created from the spaces between the ring seal and the oil seal to the outlet 82 of the bearing plate 32.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A boost system for an engine comprising:
a supercharger housing including a rotor cavity and gear case;
an input drive shaft that is configured to be driven by the engine, the input drive shaft being at least partially housed within the gear case of the supercharger housing;
a first rotor drive shaft at least partially housed within the rotor cavity of the supercharger housing;
a second rotor drive shaft at least partially housed within the rotor cavity of the supercharger housing;
a gear assembly that transfers torque between the input drive shaft and the first and second rotor drive shafts at least partially housed within the gear case of the supercharger housing;
a first ring seal located on the first rotor shaft in the rotor cavity adjacent the gear case;
a second ring seal located on the second rotor shaft in the rotor cavity adjacent the gear case;
a first annular oil seal located on the first rotor shaft between the first ring seal and the gear case;
a second annular oil seal located on the second rotor shaft between the second ring seal and the gear case;
a first air vent pathway located between the first annular oil seal and the first ring seal;
a second air vent pathway located between the second annular oil seal and the second ring seal; and
an air conduit connected to an air outlet port, the air conduit being configured to direct air from the air outlet port back into the engine, wherein the air conduit is configured to direct air from the air outlet port into a crankcase of the engine;
wherein the first and second air vent pathways intersect and flow together to the air outlet port.

2. The boost system of claim 1, wherein the air conduit is configured to direct air from the air outlet port into the engine at a location wherein the pressure therein is between 0.5 to 1.5 atmospheres.

3. The boost system of claim 1, wherein the boost system further includes a turbocharger located upstream or downstream of the supercharger.

4. The boost system of claim 1, wherein the first air vent pathway overlaps with a first oil seal receiving cavity in the axial direction.

5. The boost system of claim 4, wherein the second air vent pathway overlaps with a second oil seal receiving cavity in the axial direction.

6. A boost system for an engine comprising:
a supercharger housing including a rotor cavity and gear case;
an input drive shaft that is configured to be driven by the engine, the input drive shaft being at least partially housed within the gear case of the supercharger housing;
a first rotor drive shaft at least partially housed within the rotor cavity of the supercharger housing;
a second rotor drive shaft at least partially housed within the rotor cavity of the supercharger housing;
a gear assembly that transfers torque between the input drive shaft and the first and second rotor drive shafts at least partially housed within the gear case of the supercharger housing;
a first ring seal located on the first rotor shaft in the rotor cavity adjacent the gear case;
a second ring seal located on the second rotor shaft in the rotor cavity adjacent the gear case;
a first annular oil seal located on the first rotor shaft between the first ring seal and the gear case;
a second annular oil seal located on the second rotor shaft between the second ring seal and the gear case;
a first air vent pathway located between the first annular oil seal and the first ring seal; and
a second air vent pathway located between the second annular oil seal and the second ring seal;
wherein the first and second air vent paths are straight intersecting drilled bores of between 2.0 millimeters and 4.0 millimeters.

7. A boost system for an engine comprising:
a supercharger housing including a rotor cavity and gear case;
a bearing plate located between the rotor cavity and the gear case;
an input drive shaft that is configured to be driven by the engine, the input drive shaft being at least partially housed within the gear case of the supercharger housing;
a first rotor drive shaft housed within the rotor cavity of the supercharger housing, and at least partially extending through the bearing plate;
a second rotor drive shaft housed within the rotor cavity of the supercharger housing, and at least partially extending through the bearing plate; and
a gear assembly that transfers torque between the input drive shaft and the first and second rotor drive shafts at least partially housed within the gear case of the supercharger housing;
wherein the bearing plate includes a first annular shouldered cylindrical surface that together with an external surface of the first rotor drive shaft defines a first oil seal cavity and includes a second annular shouldered cylindrical surface that together with an external surface of the second rotor drive shaft defines a second oil seal cavity;
wherein the first rotor drive shaft defines a first annular ring receiving groove coaxially arranged with the first oil seal cavity;
wherein the second rotor drive shaft defines a second annular ring receiving groove coaxially arranged with the second oil seal cavity;
wherein the first and second rotor drive shafts rotate relative to the bearing plate; and
a first ring located in the first annular ring receiving groove and a second ring located in the second annular ring receiving groove, wherein the first and second rings, the first and second annular ring receiving grooves, and the bearing plate are configured such that pressure on a rotor cavity side of the first and second rings can be as great as 45 psi and pressure on a gear side of the ring is zero psi.

8. The boost system of claim 7, wherein the bearing plate includes a vent path that is configured to direct air from between the first annular ring receiving groove and the first oil seal cavity and from between the second annular ring receiving groove and the second oil seal cavity to an air outlet located on the bearing plate.

9. The boost system of claim 8, further comprising a conduit that directs air from the air outlet on the bearing plate into the engine upstream of a turbocharger.

10. The boost system of claim 8, further comprising a conduit that directs air from the air outlet on the bearing plate into a vented air receiving location on the engine, wherein the vented air receiving location has an operating pressure of less than 2 ATM.

11. The boost system of claim 8, wherein the first rotor drive shaft and the second rotor drive shaft are generally parallel and are configured to drive the rotation of a pair of meshed rotors mounted thereto.

12. A method of providing boost to an engine comprising:
directing compressed air from a turbocharger into a rotor cavity of a supercharger;
driving the rotation of a first rotor shaft and a second rotor shaft in the rotor cavity to further compress the air;
limiting the amount of gear lubricating fluid contained in a gear box of the supercharger from entering the rotor cavity by providing a first oil seal and a second oil seal, the first and second oil seals each being between the rotor cavity and the gear assembly;
limiting the amount of air pressure on a rotor cavity side of the oil seal by positioning a first ring seal on the first rotor shaft between the rotor cavity and the first oil seal and a second ring seal on the second rotor shaft between the rotor cavity and the second oil seal, including providing an air escape between the first oil seal and the first ring seal and between the second oil seal and the second ring seal;
directing air flow from between the first and second ring seals and the first and second oil seals back into the engine for combustion;
drilling a first through bore hole that extends from an exterior of a bearing plate to an annular shaft receiving aperture at a location between the first ring seal on the first rotor shaft and a first oil seal cavity; and
drilling a second through bore hole that extends from an exterior of a bearing plate to an annular shaft receiving aperture at a location between the second ring seal on the second rotor shaft and a second oil seal cavity, wherein the first and second through bore holes intersect at a first junction.

13. The method of claim 12, including drilling a third bore hole that extends from an exterior of a bearing plate and the first junction, and drilling a fourth bore hole that extends from an exterior of a bearing plate and intersects with the third bore hole.

* * * * *